(12) United States Patent
Chatenet et al.

(10) Patent No.: US 9,689,271 B2
(45) Date of Patent: Jun. 27, 2017

(54) TURBINE ENGINE IMPELLER

(75) Inventors: Luc Henri Chatenet, Seine Port (FR); John Le Quellec, Vaux le Penil (FR)

(73) Assignee: SNECMA, Paris (FR)

(*) Notice: Subject to any disclaimer, the term of this patent is extended or adjusted under 35 U.S.C. 154(b) by 744 days.

(21) Appl. No.: 14/118,436

(22) PCT Filed: May 14, 2012

(86) PCT No.: PCT/FR2012/051061
§ 371 (c)(1),
(2), (4) Date: Feb. 11, 2014

(87) PCT Pub. No.: WO2012/156633
PCT Pub. Date: Nov. 22, 2012

(65) Prior Publication Data
US 2014/0178202 A1 Jun. 26, 2014

(30) Foreign Application Priority Data
May 17, 2011 (FR) .................................... 11 54301

(51) Int. Cl.
*F01D 5/32* (2006.01)
*F01D 5/30* (2006.01)
(Continued)

(52) U.S. Cl.
CPC ............ *F01D 5/326* (2013.01); *B23P 15/006* (2013.01); *F01D 5/3038* (2013.01);
(Continued)

(58) Field of Classification Search
CPC .... B23P 15/006; F04D 29/023; F04D 29/322; Y10T 29/49332; F05D 2300/505; F05D 2260/30; Y10S 416/50
See application file for complete search history.

(56) References Cited

U.S. PATENT DOCUMENTS 2,847,187 A * 8/1958 Murphy .................. F01D 5/323
29/451
3,986,779 A * 10/1976 Beckershoff ............ F01D 5/323
403/20
(Continued)

FOREIGN PATENT DOCUMENTS

CH        DE 3236021 A1 * 5/1983 .............. C22F 1/006
DE        32 36 021      5/1983
(Continued)

OTHER PUBLICATIONS

Translation of DE3236021, Google Patents Translate, Ret. Jun. 20, 2016.*
(Continued)

*Primary Examiner* — Jacob Cigna
(74) *Attorney, Agent, or Firm* — Oblon, McClelland, Maier & Neustadt, L.L.P.

(57) ABSTRACT

A turbine engine rotor wheel including a disk including at least one slot formed in its outer periphery for mounting roots of blades, a presser being mounted between each blade root and a bottom of the slot. The presser is bistable in position and is capable of occupying a first stable position for assembly and disassembly in which it does not exert a force on the blade root, and a second stable position in which it exerts a radial force on the blade root to hold the blade stationary and to stabilize the blade in a final position.

7 Claims, 2 Drawing Sheets

(51) Int. Cl.
*F04D 29/02* (2006.01)
*F04D 29/32* (2006.01)
*B23P 15/00* (2006.01)

(52) U.S. Cl.
CPC ........... *F01D 5/3092* (2013.01); *F01D 5/323* (2013.01); *F04D 29/023* (2013.01); *F04D 29/322* (2013.01); *F05D 2260/30* (2013.01); *F05D 2300/505* (2013.01); *Y02T 50/671* (2013.01); *Y10T 29/49332* (2015.01)

(56) References Cited

U.S. PATENT DOCUMENTS

| | | | | |
|---|---|---|---|---|
| 5,052,890 | A * | 10/1991 | Roberts | F01D 5/26 416/193 A |
| 5,139,389 | A * | 8/1992 | Eng | F01D 5/3007 416/219 R |
| 5,236,309 | A * | 8/1993 | Van Heusden | F01D 5/323 416/206 |
| 5,584,659 | A * | 12/1996 | Schmidt | F01D 5/027 416/144 |
| 6,837,686 | B2 * | 1/2005 | Di Paola | F01D 5/323 416/220 R |
| 7,108,484 | B2 * | 9/2006 | Thenaisie | F01D 5/323 416/221 |
| 8,215,914 | B2 * | 7/2012 | Danescu | F01D 5/3007 416/219 R |
| 2005/0207892 | A1 | 9/2005 | Kanebako et al. | |
| 2006/0165530 | A1 | 7/2006 | Corbin et al. | |
| 2010/0189564 | A1 | 7/2010 | Stone | |
| 2010/0296937 | A1 | 11/2010 | Bestwick | |
| 2011/0171031 | A1 | 7/2011 | Benkler et al. | |
| 2012/0210579 | A1 | 8/2012 | Stone | |
| 2013/0156591 | A1 * | 6/2013 | Alexander | F01D 5/3092 416/221 |
| 2014/0161617 | A1 * | 6/2014 | Chatenet | F01D 5/323 416/221 |

FOREIGN PATENT DOCUMENTS

| | | |
|---|---|---|
| DE | 10 2005 008 509 | 9/2005 |
| EP | 2 090 750 | 8/2009 |
| EP | 2 253 800 | 11/2010 |
| FR | 2 881 174 | 7/2006 |
| JP | 61 129405 | 6/1986 |
| JP | 1 237304 | 9/1989 |
| JP | 2007 120460 | 5/2007 |

OTHER PUBLICATIONS

U.S. Appl. No. 14/236,254, filed Jan. 30, 2014, Chatenet, et al.
International Search Report Issued Sep. 5, 2012 in PCT/FR12/051061 Filed May 14, 2012.

* cited by examiner

TURBINE ENGINE IMPELLER

BACKGROUND OF THE INVENTION

Field of the Invention

The present invention relates to a turbine engine rotor wheel.

Description of the Related Art

A rotor wheel conventionally comprises a disk carrying fan blades at its outer periphery, these blades having roots that are engaged in substantially axial slots in the outer periphery of the disk. The fan blades are held radially on the disk by co-operation between the shapes of their roots and of the slots in the disk, the blade roots being of the dovetail type, for example. Inter-blade platforms are mounted on the disk between the fan blades or they form integral portions of the disk. Blades of this type are described for example in document FR 2 881 174, in the name of the Applicant. The slots, which may also be referred to as sockets, may be straight or curvilinear, and the contact surfaces between the roots of the blades and the inside walls of the slots are referred to as bearing surfaces.

The blades are mounted with clearance between their roots and the walls of the slots. In order to reduce this clearance, proposals have already been made to mount resilient pressers between the bottoms of the slots and the blade roots, so that the blade roots are held pressed radially against the bearing surfaces of the disk. Nevertheless, the use of pressers is possible only with blades of large size, such as fan blades, since large size makes it possible to fabricate the pressers and for them to have sufficient stiffness to be capable of being mounted by force without being deformed.

The pressers must also be very accurate so that the blades are held, but without being completely blocked in a position that does not enable the blades roots to press normally against the bearing surfaces of the slots.

That type of rotor wheel presents the drawbacks set out below.

Rotation of the rotor wheel during operation of the turbine engine causes high levels of radial force to be applied to the blades, thereby keeping them in their operating or "working" positions. By way of example, a high pressure compressor blade weighing 17 grams (g) may be subjected to a centrifugal force of about 500 kilograms (kg), and a fan blade weighing about 4.5 kg may be subjected to a force greater than 60 (metric) tonnes (t).

In the absence of a presser or when the pressers are not sufficiently prestressed, every time the rotor wheel is stopped, it takes up a different angular position and the blades change position under the effect of their own weight.

Balancing the rotor wheel consists in eliminating any unbalance in the wheel, and this is performed at low speed, however since the positions of the blades, and thus the unbalance of the rotor wheel, are different on each occasion the wheel is started, it is not possible for this balancing to be performed with sufficient accuracy.

In addition, the small-amplitude movements under low loading of the blades that occur each time the turbine engine is started, give rise to wear on the inside surfaces of the slots for mounting the blade roots. This is known as "fretting" wear, and it can prevent the integrity of the disk and of the blades being inspected by using eddy currents, and that can lead to a disk and/or blades being scrapped even though they would normally still be usable.

In a variant, the blades may be of the type having a hammerhead attachment, the blade roots then being mounted in a circumferential slot. In the same manner as above, the blades are held radially on the disk by co-operation between the shapes of their roots and of the circumferential slot in the disk. By way of example, blades of that type are described in document FR 2 900 989, in the name of the Applicant.

The blade roots are inserted radially into the circumferential slot through a single notch in the disk, with the blades then being slid circumferentially along the slot to their final positions. The blades are held by a latch, with circumferential clearance being maintained between the blades in order to accommodate thermal expansion during operation of the turbine engine.

It is not possible to mount pressers between the blade roots and the bottom of the circumferential slot.

Once the blades are mounted they are movable along the slot over a distance corresponding to the total value of the circumferential clearances between the blades.

Thus, each time the wheel is stopped, the blades can change position since the angular position of the wheel is not necessarily the same. The blades then become repositioned in random manner under their own weight within the limit of the available clearance. These changes in the positions of the blades have several direct consequences on the balancing of the rotor wheel and on its lifetime.

At the time of balancing, the changes in the positions of the blades lead to dispersion in measurements of the unbalance from one engine start to another. This dispersion puts a limit on the accuracy with which balancing can be performed, and that has significant consequences on the forces transmitted to the bearings and on the levels of vibration that are perceived.

Another consequence is lateral wear of the platforms, which press against one another with relative movement on each start. This wear further amplifies the tangential clearance between the blades, thereby leading to greater unbalance and to wear of the bearing surfaces of the disk and of the blade roots.

In the same manner as above, the movement of the blades can also give rise to fretting wear of the inner walls of the blade root mounting slots, thereby making it difficult to check them for cracks by using eddy currents.

Finally, there is the possibility of using bladed disks that are made as a single piece, in which the blades and the disks are made as a single piece by machining.

Nevertheless, that technique cannot always be applied to all of the rotor wheels, in particular because of thermal stresses, of mechanical stresses, and of weight stresses, and that technique presents very high costs in terms of manufacturing and maintenance.

It is also difficult if not impossible to machine cooling circuits in the blades of single-piece bladed disks or "blisks".

Documents JP 2007-120460, DE 32 36 021, JP 1-237304, and JP 61-129405 describe using shape memory pressers that are suitable for deforming between two positions as a function of temperature.

The cooling and the heating of those pressers is relatively difficult to implement and to control.

BRIEF SUMMARY OF THE INVENTION

A particular object of the invention is to provide a solution to the above-specified problems that is simple, effective, and inexpensive.

To this end, the invention provides a turbine engine rotor wheel comprising a disk having at least one slot formed in its outer periphery for mounting the roots of blades, a presser being mounted between each blade root and the bottom of the slot, the presser being of the type that is bistable in position, being capable of occupying a first stable position for assembly and disassembly in which it does not exert a force on the blade root, and a second stable position in which it exerts a radial force on the blade root in order to hold the blade stationary and in order to stabilize it in a final position, the wheel being characterized in that the shape and the weight of the presser are determined so that the passage from the first stable position to the second stable position is exerted by centrifuging, e.g. by rotating the wheel at a speed faster than 2000 revolutions per minute (rpm).

In this way, it is possible to mount the pressers in a first position together with the blades in the slot(s) of the disk, and subsequently to rotate the disk at a speed that is sufficient to cause the pressers and the blades to take up their final positions, with each presser deforming in such a manner as to pass from its first position to its second position, the blade subsequently being held in its final position by the presser, even when the disk has stopped or is rotating at low speed. The rotor wheel can then be balanced in accurate manner at low speed.

Given the low stresses or forces that are applied by the pressers on the disk, there is no need for any specific redimensioning of the disk.

According to a characteristic of the invention, the presser comprises a spring blade that is deformable between the two above-mentioned positions.

Advantageously, the spring blade bears at its ends against the bottom of the slot and includes a deformable central zone that is bistable in position.

The ends of the spring blade may have curved rims that are folded towards the central zone, in such a manner as to avoid damaging the bottom of the slot.

In another characteristic of the invention, the central zone of the spring blade includes a flyweight.

The flyweight may thus be dimensioned so as to adjust accurately the speed of rotation beyond which the passage occurs from the first stable position to the second.

In an embodiment of the invention, the disk includes a circumferential slot in which the blade roots and the pressers are engaged.

Preferably, at least one circumferential end of each presser includes at least one tongue for bearing against the corresponding blade root.

The tongue serves to position the presser accurately under the blade root.

The presser may be made of a material having shape memory, which is deformable under mechanical, thermal, or electrical stress.

The presser may then be deformed from one stable position to another by applying appropriate stress.

The invention also provides a method of assembling and balancing a wheel of the above-specified type, the method being characterized in that it comprises the steps consisting in:
- mounting the blades and the pressers in a mounting position in the slot(s) of the disk;
- causing the wheel to rotate at a speed that is fast enough to move the blades by centrifuging into a normal operating position and to cause each presser to pass into its second stable position so as to stabilize the blades in their operating position; and
- balancing the wheel in order to eliminate any unbalance.

Balancing can thus be performed in very accurate and reliable manner, the blades always remaining in the same positions, even in the event of the turbine engine performing successive stops and restarts, and regardless of the angular position of the rotor wheel.

Preferably, the pressers are caused to pass into their second stable position by rotating at a speed faster than 2000 rpm, e.g. during an operation of positioning the ends of the blades.

In addition, spacers may be mounted circumferentially between at least some of the blades prior to the blades being held by the pressers, the spacers being removed after the blades are held by the spacers.

The spacing of the blades may be performed in sectors, i.e. spacers may be arranged between only some of the blades, with the spacers defining angular sectors between one another.

This makes it possible to limit the movement of the blade roots inside the circumferential slot, when the turbine engine is started and before the blades are held stationary by the pressers.

BRIEF DESCRIPTION OF THE SEVERAL VIEWS OF THE DRAWINGS

The invention can be better understood and other details, characteristics, and advantages of the invention appear on reading the following description made by way of non-limiting example and with reference to the accompanying drawings, in which.

DETAILED DESCRIPTION OF THE INVENTION

Figure 1:
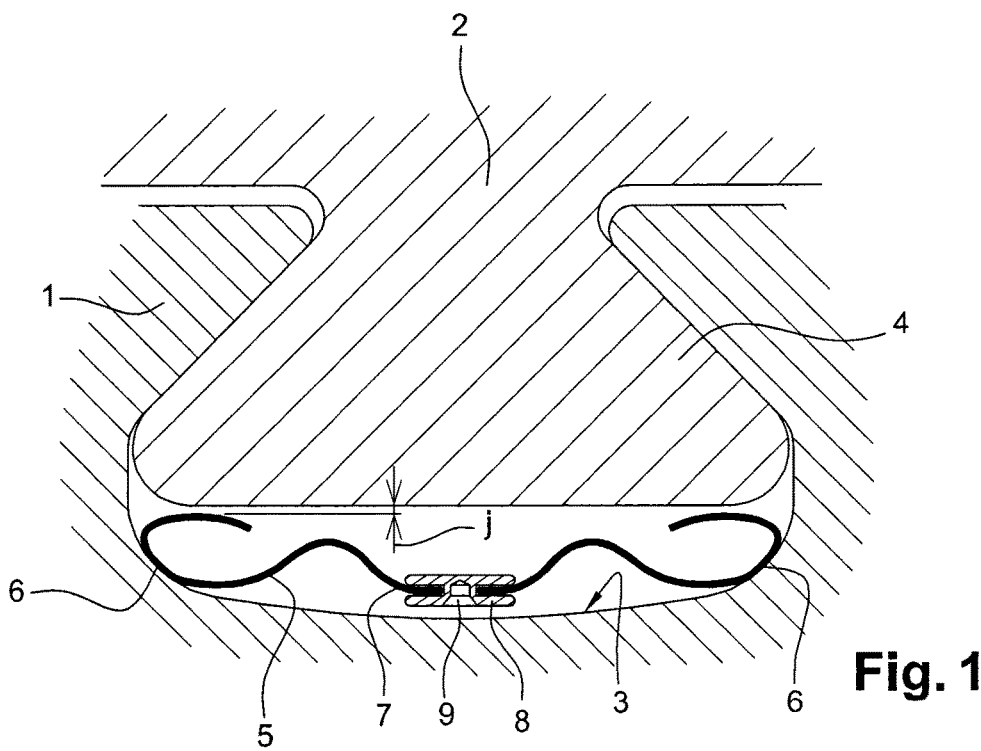
FIG. 1 is a fragmentary view in section of a rotor wheel of the invention in which the presser is in a first stable position.
Figure 2:
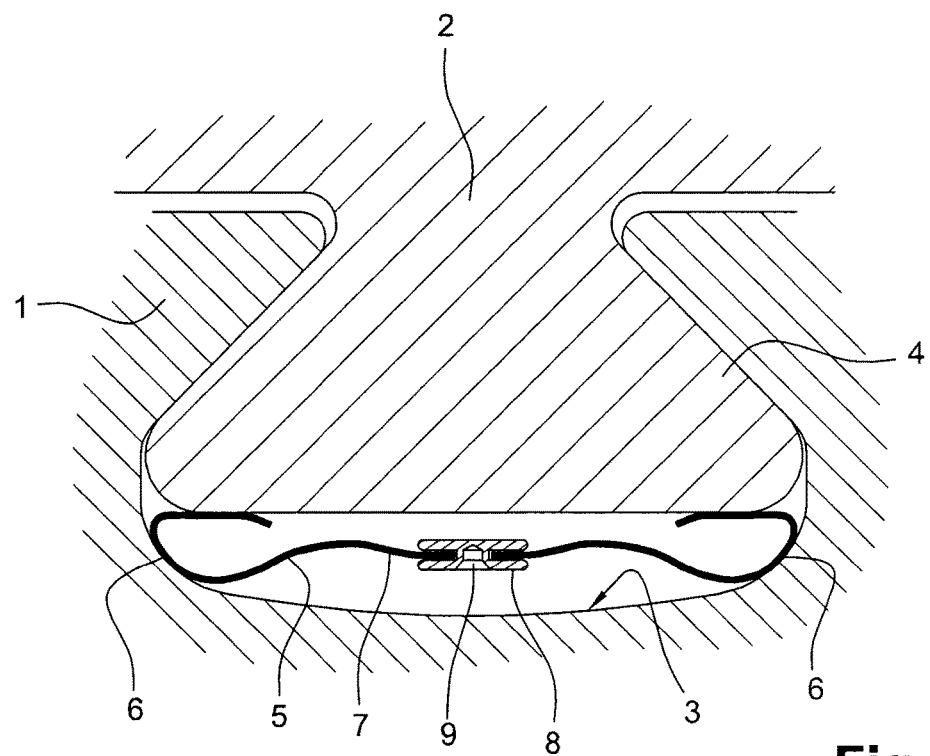
FIG. 2 is a view corresponding to FIG. 1, showing the presser passing from its first stable position to its second stable position.
Figure 3:
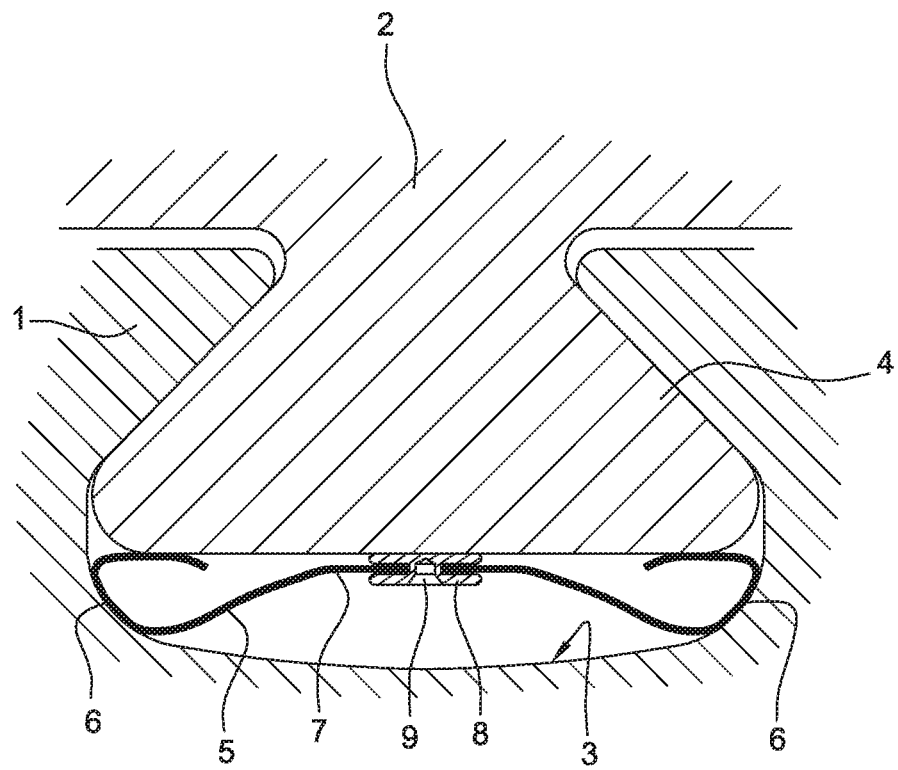
FIG. 3 is a view corresponding to FIG. 1, showing the presser in its second stable position.

FIGS. 1 to 3 show a rotor wheel of a turbine engine comprising a disk 1 having an outer periphery that is formed with a plurality of substantially axial slots or with a circumferential groove or slot 3.

Each blade 2 comprises an airfoil and a blade root 4 of dovetail shape that is engaged in the slot 3 of complementary shape in the disk 1 for the purpose of retaining the blade 2 radially on the disk 1. The blade 2 also has contiguous platforms defining an inner surface of a fluid flow passage, the platforms being situated radially between the blade roots 4 and the airfoils.

Figure 4:
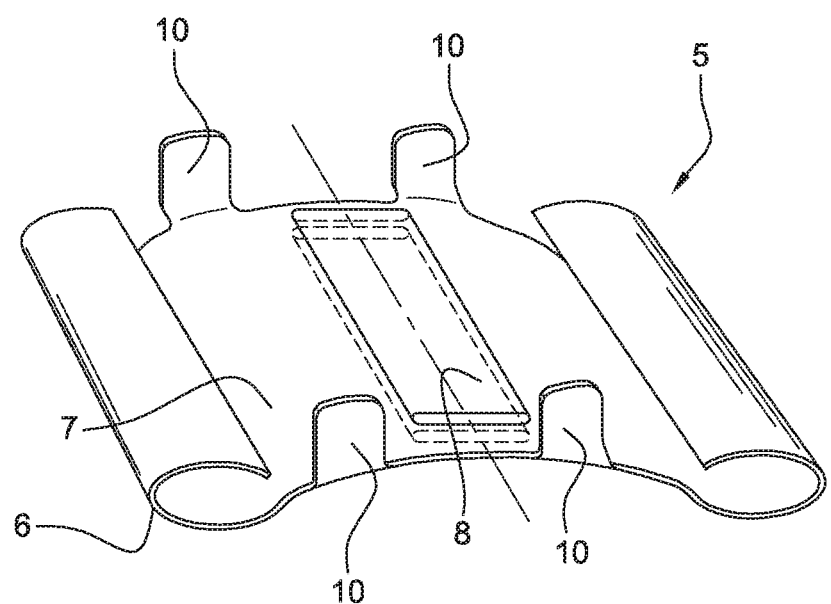
FIG. 4 is a perspective view of the presser.

A presser 5 is mounted between each blade root 4 and the bottom of the slot 3. The presser 5 is of the type that is bistable in position, being capable of occupying a first stable position for assembly or disassembly in which it does not exert any force on the blade root 4 (FIG. 1), and a second stable position in which it exerts a radial force on the blade root 4 in order to hold the blade 2 stationary and in order to stabilize it in a final position (FIG. 3). More particularly, and as can be seen in FIG. 4, the presser 5 is in the form of a spring blade that is deformable between the two above-mentioned positions. The spring blade 5 bears against the bottom of the slot 3 via its ends 6, which ends include curved rims extending towards the central zone 7. A flyweight 8 is fastened to the central zone 7 of the spring blade 5, e.g. by means of a screw 9 or by crimping.

The shape and the weight of the spring blade 5 and of the flyweight 8 are determined so that it is caused to pass automatically from the first stable position (FIG. 1) to the second stable position (FIG. 3) by centrifuging, when the wheel is rotating at a speed faster than 2000 rpm.

When mounting in a circumferential slot 3, each circumferential end of the pressers 5 has one or two tongues 10 for bearing against a blade root (FIG. 4), so as to ensure that the presser is properly positioned relative to the corresponding blade root.

The presser 5 may be made of a metal material having mechanical characteristics that are sufficient and compatible with the temperatures reached in the zones concerned. The presser 5 may also be made of a shape memory material that deforms under mechanical, thermal, or electrical stress.

There follows a detailed description of a method of mounting and balancing a rotor wheel of the invention.

Firstly, the blades 2 and the pressers 5 are mounted in succession in the circumferential slot 3 through a single notch in the disk 1 and they are then moved circumferentially along the slot 3 to their final positions. The tongues 10 enable the pressers 5 to be held in position under the blades 2 while this movement is taking place. A latch is then mounted in the circumferential slot 3 so as to prevent any blades 2 escaping, with circumferential clearance being maintained between the blades 2 in order to accommodate thermal expansion while the turbine engine is in operation.

During this assembly, the pressers 5 are in their first position, as shown in FIG. 1, with radial clearance j being provided between the rims of the pressers 5 and the blade roots 4.

Temporary spacers are mounted circumferentially between the platforms of some of the blades 2 so as to organize the blades 2 in angular sectors, e.g. two, three, or four sectors depending in particular on the amplitude of the tangential clearance between the blades 2, on the diameter of the disk 1, and on the number of blades 2.

Thereafter, the wheel is caused to rotate at a speed that is sufficient to bring the blades 2 into their final operating positions by centrifuging, and to cause each of the pressers 5 to pass into its second stable position. By way of example, this speed of rotation may be of the order of 3000 rpm or 4000 rpm.

This initial spinning of the wheel may correspond for example to an operation of positioning of the blades 2 at their tips, i.e. their radially outer ends.

During this spinning, the rims are pressed against the blade roots 4 (FIG. 2), and then the pressers 5 deform so as to pass from the first stable shape to the second (FIG. 3).

In their second stable position, the pressers 5 press against the blade roots 4 with a force that is directed radially outwards and that is sufficient to hold the blades 2 in their operating positions. This force is determined so as to compensate for the weight of a blade 2 and also for the inertial effects that occur when starting the turbine engine.

Thereafter, rotation of the wheel is stopped or slowed down with the blades 2 being held and stabilized by the pressers 5 in their operating positions. The spacers can then be removed without risk of the blades 2 moving.

Thereafter, the rotor wheel 2 may be balanced at low speed and in accurate manner since any circumferential movements or any tilting of the blades 2 is prevented by the pressers 5.

For example, for a blade 2 that weighs 17 g, the speed for changing the position of the presser 5 may be selected to be about 2500 rpm or indeed about 3500 rpm, with the residual force that is applied against the blade root 4 in the second stable position then being 0.5 newtons (N). The flyweight 8 may weigh about 0.15 g if the speed of rotation corresponding to the change of position is 2500 rpm, or about 0.075 g if this speed of rotation is 3500 rpm.

In a variant, the blade roots 4 may be housed in slots that are substantially axial, as described in document FR 2 881 174. Under such circumstances, the pressers 5 need not necessarily have tongues 10. The principle on which the invention operates nevertheless remains similar to that described above.

The invention claimed is:

1. A turbine engine rotor wheel comprising:
   a disk including a slot formed in an outer periphery for mounting a root of a blade; and
   a presser mounted between the blade root and a bottom of the slot, the presser being bistable in position, being capable of occupying a first stable position for assembly and disassembly in which the presser does not exert a force on the blade root, and a second stable position in which the presser exerts a radial force on the blade root to hold the blade stationary and to stabilize the blade in a final position,
   wherein a shape and a weight of the presser are determined so that passage from the first stable position to the second stable position is performed by centrifuging,
   wherein the presser comprises a spring blade that is deformable between the first and second positions,
   wherein ends of the spring blade bear against the bottom of the slot and the spring blade includes a deformable central zone that is bistable in position, and
   wherein the central zone of the spring blade includes a flyweight.

2. A wheel according to claim 1, wherein the ends of the spring blade include curved rims that are folded towards the central zone.

3. A wheel according to claim 1, wherein the presser is made of a material having shape memory, which is deformable under mechanical, thermal, or electric stress.

4. A wheel according to claim 1, wherein the disk includes a circumferential slot in which the blade roots and the pressers are engaged.

5. A wheel according to claim 4, wherein at least one circumferential end of each presser includes at least one tongue for bearing against the corresponding blade root.

6. A method of assembling and balancing a wheel comprising a disk including a slot formed in an outer periphery for mounting a root of a blade; and a presser mounted between the blade root and a bottom of the slot, the presser being bistable in position, being capable of occupying a first stable position for assembly and disassembly in which the presser does not exert a force on the blade root, and a second stable position in which the presser exerts a radial force on the blade root to hold the blade stationary and to stabilize the blade in a final position, wherein a shape and a weight of the presser are determined so that passage from the first stable position to the second stable position is performed by centrifuging, the method comprising:
   mounting the blade and the presser in a mounting position in the slot of the disk;
   causing the wheel to rotate at a speed that is fast enough to move the blade by centrifuging into a normal operating position and to cause the presser to pass into the second stable position so as to stabilize the blade in an operating position; and
   balancing the wheel to eliminate any unbalance,
   wherein a spacer is mounted circumferentially between two blades prior to one of the blades being held by the presser, the spacer being removed after the one of the blades is held by the presser.

7. A method according to claim 6, wherein the presser is caused to pass into the second stable position by rotating at a speed faster than 2000 rpm, or during an operation of positioning an end of the blade.

\* \* \* \* \*